Patented Aug. 25, 1925.

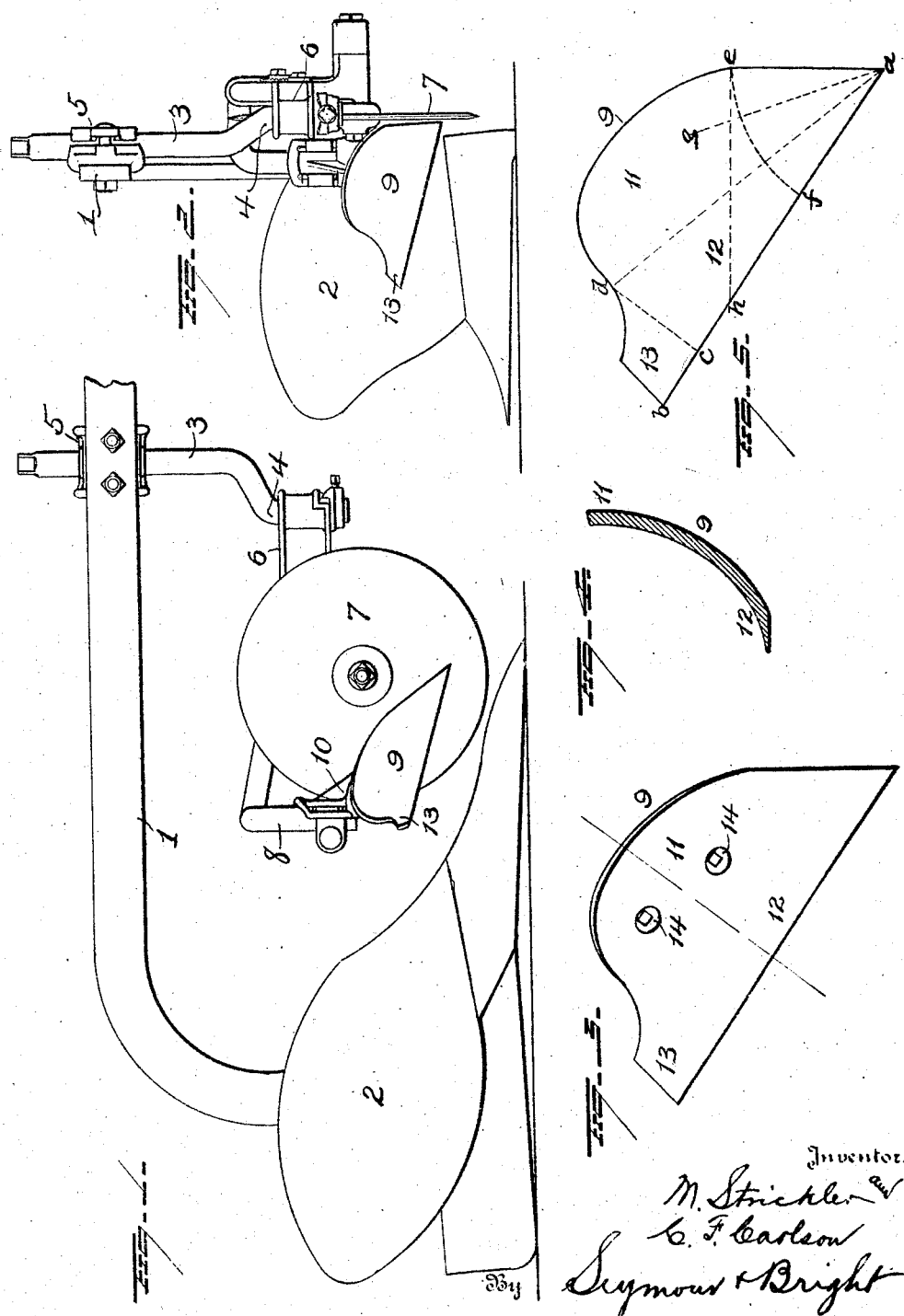

1,550,990

UNITED STATES PATENT OFFICE.

MONROE STRICKLER AND CHARLES F. CARLSON, OF SOUTH BEND, INDIANA, ASSIGNORS TO OLIVER CHILLED PLOW WORKS, OF SOUTH BEND, INDIANA.

JOINTER FOR PLOWS.

Application filed March 17, 1923. Serial No. 625,770.

*To all whom it may concern:*

Be it known that we, MONROE STRICKLER and CHARLES F. CARLSON, citizens of the United States, and residents of South Bend, in the county of Saint Joseph and State of Indiana, have invented certain new and useful Improvements in Jointers for Plows; and we do hereby declare the following to be a full, clear, and exact description of the invention, such as will enable others skilled in the art to which it appertains to make and use the same.

This invention relates to improvements in jointers for plows.

With the use of jointers as heretofore constructed, where the share or cutting portion is shorter than the mold-board or slice turning portion, it frequently happens, especially when plowing in uneven ground at an irregular speed, that the slice will not be entirely cut off and that it then has a tendency to fall back behind the jointer instead of into the preceding furrow.

An object of our invention is to so construct a jointer that it will operate to throw a more uniform slice of earth into the preceding furrow than is possible with a jointer having a long mold-board and a short share portion, and especially when the plow is being drawn at high and uneven speed, as with a tractor traveling up and down hill in uneven ground, but which will also operate effectively when used on a slow-moving horse-drawn plow.

With this and other objects in view, the invention consists in certain novel features of construction and combinations of parts as hereinafter set forth and pointed out in the claims.

In the accompanying drawings;

Figure 1 is a view of a portion of a plow having a colter thereon, and showing the application of our improvements;

Figure 2 is a front view of the same;

Figure 3 is a face view of the jointer;

Figure 4 is a transverse sectional view of the same, and

Figure 5 is a diagrammatical view of the jointer.

In Figure 1 of the drawing, a portion of a plow beam is shown at 1 and a plow base at 2. A vertically disposed standard 3 having a crank 4, may be secured to the plow beam as indicated at 5 and with said crank, one end of an arm 6 may be connected. This arm may carry suitable bearing means for a colter 7, and it may also carry a member 8 to support a jointer. The specific supporting means for the jointer do not constitute part of our present invention, and may be such as disclosed in patent to E. M. Heylman No. 1,207,166 December 5, 1916, or any other suitable means may be employed for supporting the colter and jointer.

Our improved jointer is shown at 9 and may be provided with a frog or bracket 10 to be clamped to the member 8 or other suitable support.

The jointer 9 comprises a mold board portion 11 and a share portion 12, and the latter is made with a part to extend rearwardly beyond the former to provide a rearward extension 13, all as clearly shown in Figure 5. The jointer as a whole is dished or made concavo-convex as clearly indicated in Figure 4 and it may be provided with holes 14 for the accommodation of bolts or rivets for securing the frog or bracket 10 thereto.

Referring to the diagrammatical view, Figure 5, it will be observed that the cutting portion $a$—$b$ extends beyond a perpendicular line $c$—$d$ extending across the cutting or share portion and intersecting a line $a$—$d$ extending from the point of the jointer to the rear end of the mold-board portion of the jointer. This line $a$—$d$ divides the jointer so that approximately one-third of its working surface is disposed below this line and forms the share portion and two thirds above said line forms the mold-board portion, the line $a$—$g$ representing the division of the forward portion of the latter into thirds. Thus the forward portion of the earth-engaging surface may be said to be divided into tapering thirds converging at the point $a$, one of which represents a share portion and the other two thirds represent a mold board portion, the share portion 11 being made with the extension 13 which projects rearwardly beyond the rear end of the mold board portion 10. The term "forward portion of the earth engaging surface" is intended to mean that portion described by the lines from $a$ to $e$; from $e$ to $f$ and from $f$ to $a$.

The jointer may, at the end $a$, be made either pointed or somewhat rounded. The line $e$—$h$ on the diagram Figure 5 may represent the ground line and thus the approximate depth of penetration of the jointer is denoted and the line *a—e* represents that portion of the jointer which severs the slice from the furrow bank.

With the use of our improvements, the jointer will operate to throw a uniform slice of earth into the preceding furrow and it will operate to completely sever the slice of earth, cause it to be turned over and prevent it from falling back behind the jointer instead of into the preceding furrow.

Having fully described our invention, what we claim as new and desire to secure by Letters-Patent, is:—

1. A jointer having a dished body comprising turning and cutting portions, the cutting portion extending rearwardly beyond the turning portion.

2. A jointer having a dished form and comprising a mold board portion and a share portion, said share portion having a straight edge, a rearward extension projecting beyond the rear end of the mold-board portion, and having its edge in line with the straight edge of the main portion of the share.

3. A dished jointer having approximately two-thirds of its working surface above the lower one-third, forming a mold-board portion and the lower one-third forming a share portion, the share portion provided with a rear portion projecting rearwardly beyond the rear end of the mold-board portion.

4. A jointer having a dished form and approximately two-thirds of its surface forming a mold-board portion and about one-third, a share portion, the share portion extending rearwardly beyond the mold-board portion.

5. A jointer having dished form and approximately two-thirds of its surface forming a mold-board portion and about one-third, a share portion, the share portion extending rearwardly beyond the mold-board portion, and the forward portion of the earth-engaging surface of the share forming three approximately equal tapering surface areas converging at the point of the share.

In testimony whereof, we have signed this specification.

MONROE STRICKLER.
CHARLES F. CARLSON.